(12) United States Patent
Konno (10) Patent No.: US 6,733,409 B2
(45) Date of Patent: May 11, 2004

(54) GUIDE FOR TRANSMISSION DEVICE

(75) Inventor: Masahiko Konno, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 91 days.

(21) Appl. No.: 10/256,840

(22) Filed: Sep. 27, 2002

(65) Prior Publication Data

US 2003/0078120 A1 Apr. 24, 2003

(30) Foreign Application Priority Data

Oct. 19, 2001 (JP) ........................................ 2001-322380

(51) Int. Cl.[7] ................................................. F16H 7/18
(52) U.S. Cl. ...................................... 474/111; 474/140
(58) Field of Search ................................ 474/111, 140

(56) References Cited

U.S. PATENT DOCUMENTS 5,318,482 A    6/1994   Sato et al.
6,036,613 A  * 3/2000   Diehm ........................ 474/111
6,312,353 B1 * 11/2001  Oba ............................ 474/140
2002/0132688 A1 * 9/2002 Ono ............................ 474/111

FOREIGN PATENT DOCUMENTS

EP      1 241 380 A2   9/2002

* cited by examiner

Primary Examiner—Thomas R. Hannon
(74) Attorney, Agent, or Firm—Howson and Howson (57) ABSTRACT

A guide for a chain, or similar endless, flexible, power transmission device, is composed of a molded guide body, and a reinforcing plate fitting into a slot in the guide body. A nearly circular, but slightly elongated, mounting hole in the guide body is elongated in the front-to-back direction of the guide. The elongated mounting hole overlaps a circular mounting hole in the reinforcing plate, and allows relative adjustment of the positions of the holes so that the guide can be more easily mounted on an inner wall of an engine by a bolt or pin which extends through both mounting holes.

2 Claims, 9 Drawing Sheets

GUIDE FOR TRANSMISSION DEVICE

FIELD OF THE INVENTION

This invention relates to a guide for a mechanical power transmission device, of the kind used in an automobile engine for valve timing, in which power is transmitted through a flexible, circulating, power transmission medium such as a chain, a belt or the like. The invention relates more specifically to a guide which limits the traveling path of the transmission medium, to prevent vibration noise, transverse vibration, and meshing failure, or to a guide which, in cooperation with a tensioner, imparts tension to the transmission medium.

Figure 8:
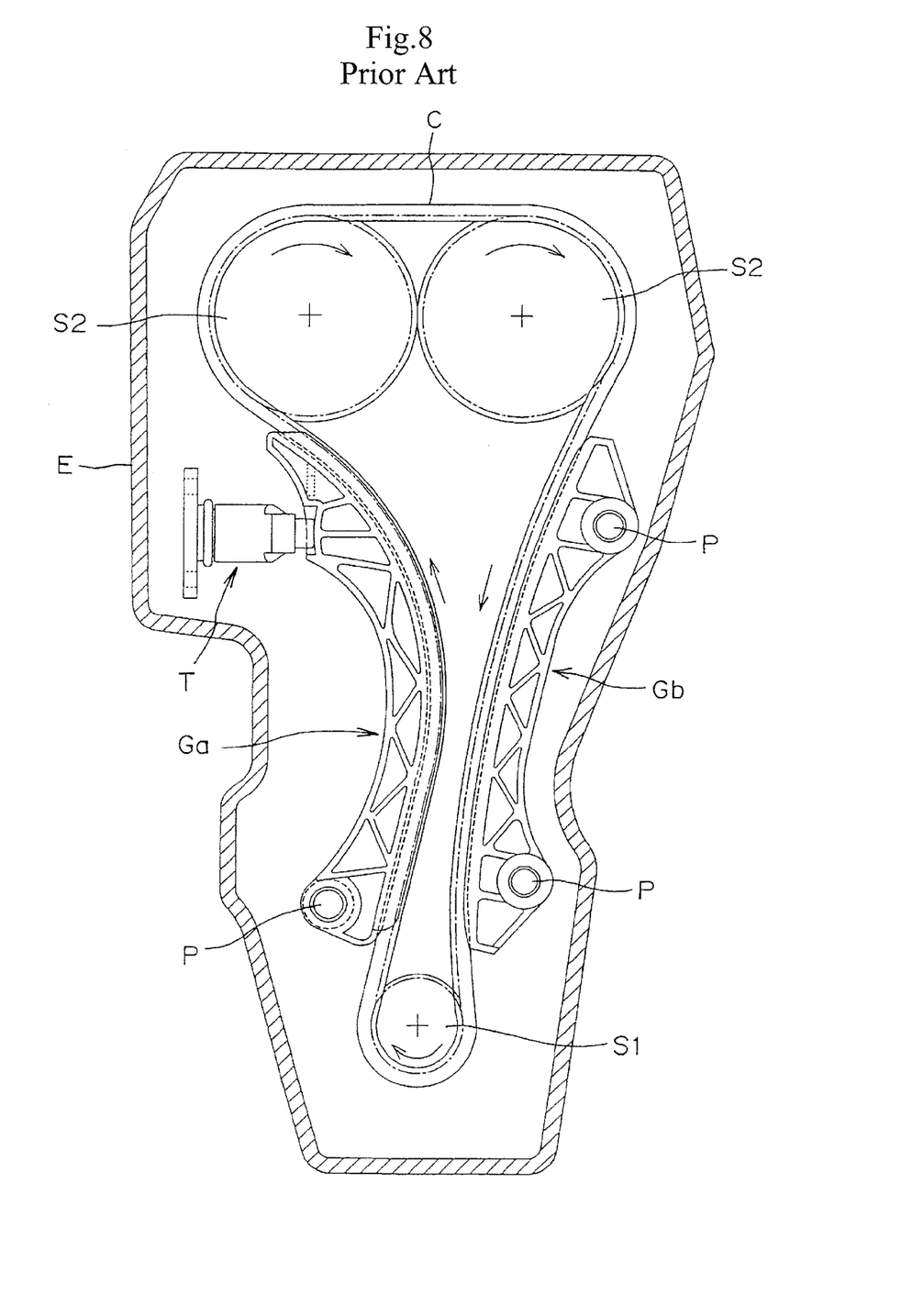
FIG. 8 is schematic view showing a timing transmission of an engine, with fixed and movable guides mounted on an internal wall of the engine.

FIG. 8 shows a typical timing drive of an engine E, in which an endless chain C, travels over a driving sprocket S1 and a pair of driven sprockets S2. A movable guide Ga, over which the chain C slides, cooperates with a tensioner T to impart tension to the chain. A fixed guide Gb limits the traveling path of the chain C to prevent vibration noise, transverse vibration, and meshing failure. Both guides are attached to an inner wall of the engine by attachment means P, which may be mounting bolts, pins or the like.

Figure 9:
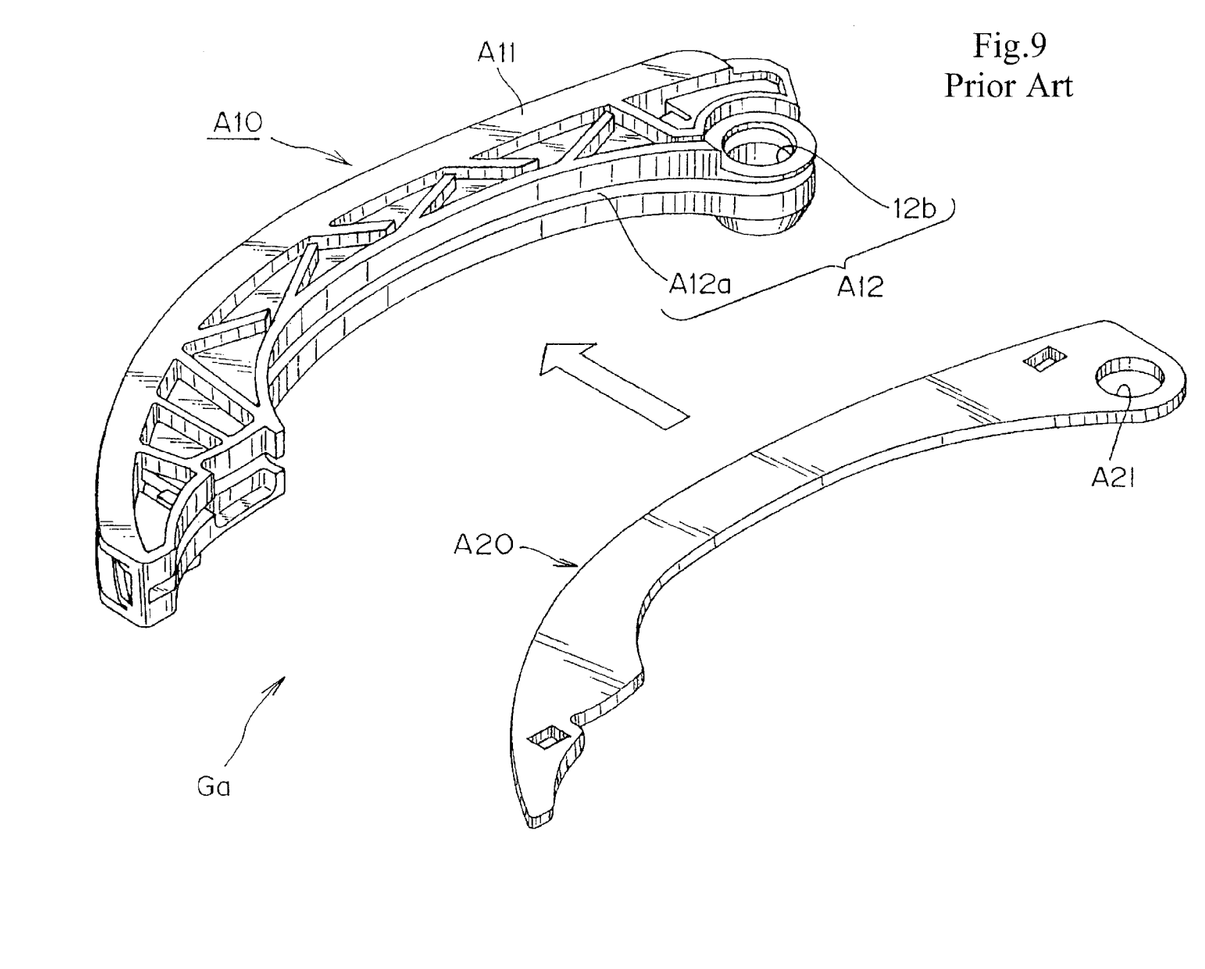
FIG. 9 is an exploded view of a conventional guide composed of a molded guide body and a reinforcing plate.

As shown in FIG. 9, the movable guide Ga comprises a shoe A11 for sliding contact with a chain, and a guide body A10 integrally molded with the shoe. The guide body includes a plate-receiving portion A12, which extends longitudinally along the back of the shoe A11, that is, on the side of the shoe opposite the chain-contacting side. A reinforcing plate A20, which reinforces the guide body A10, fits into a slot A12a, which is open along the length of the plate-receiving portion A12. The movable guide Ga is mounted on an inner wall of an engine by a mounting bolt P, which is inserted into a mounting hole A12b bored through the guide body A10 and a mounting hole A21 bored through the reinforcing plate A20, and in register with hole A12b when the reinforcing plate is located in the slot A12a.

In the conventional movable guide Ga, the mounting hole A12b in the guide body A10 has the same hole diameter as the mounting hole A21 in the reinforcing plate A20. Thus, when the centers of the hole A12b and the hole A21 are shifted relative to each other by even a slight distance during assembly, either in the longitudinal direction of the guide or in the front-to-rear direction, in many cases the mounting bolt P cannot be inserted through the mounting holes. Moreover, when the mounting bolt P can be inserted through the holes, the tightness of the fit resulting from misalignment of the mounting holes can prevent the guide from pivoting smoothly on its mounting bolt.

In a high temperature environment such as encountered in an engine the guide body A10, which is composed of synthetic resin, is subject to thermal shrinkage, which can cause the guide body A10 to shift relative to the reinforcing plate. Such shifting not only impairs smooth rotation of the guide on the mounting bolt P, but also deforms the shape of the guide and reduces its strength and durability significantly.

Accordingly, among the objects of the invention are the solution of one or more of the above-mentioned problems of the prior art, and the provision of a guide for a flexible transmission medium, in which a reinforcing plate can be easily fitted into a guide body during assembly, and which can be easily mounted on bolt or mounting pin in a location such as on an inner wall of an engine.

To address the above objects the guide in accordance with the invention comprises an elongated guide body and a reinforcing plate. The guide body is composed of an elongated shoe having a front surface for sliding contact with the power transmission medium and a back side, and a plate-receiving portion extending longitudinally along the back side of said shoe and having a longitudinally extending slot open in a direction opposite to the direction in which said front surface of the shoe faces. The shoe and plate-receiving portion are integrally molded as a unit from a synthetic resin. The reinforcing plate fits into the slot. The guide body has a nearly circular, but elongated, mounting hole adjacent one end of the guide body. The mounting hole in the guide body is elongated in the front-to-back direction of the shoe. The reinforcing plate has a circular mounting hole, and the elongated mounting hole of the guide body overlaps the circular mounting hole of the reinforcing plate. An attachment means, such as a bolt or pin is inserted through the circular and elongated mounting holes, and supports the guide on an inner wall of an engine.

The plate-receiving portion has first and second ends spaced from each other along the longitudinal direction of the guide body, and, in a preferred embodiment, the guide body has a positioning guide wall at one end of its plate-receiving portion, for guiding the reinforcing plate in the front-to-back direction of the shoe during assembly of the guide, and limiting the shift of the reinforcing plate in the longitudinal direction of the guide body during operation of the guide.

The guide according to the invention may be a fixed guide for sliding contact with a chain, a belt or other circulating transmission medium, in order to prevent vibration noise, transverse vibration, meshing failure and the like by limiting the traveling path of the transmission medium. Alternatively, the guide may be a movable guide, which, in cooperation with a tensioner, imparts appropriate tension to a circulating transmission medium.

The synthetic resins of which the guide body is composed are not limited particularly, but they are preferably synthetic resins such as nylon 6, nylon 66, and all aromatic nylons referred to as "engineering plastics," which have excellent wear resistance and lubricating properties, so that they are suitable to function as a shoe for sliding contact with a traveling transmission medium. The resins may be fiber-reinforced where improved strength is required.

The reinforcing plate may be composed of any suitable material which can reinforce the guide body. For example, iron-based metal such as cast iron, stainless steel or the like, non-iron metals such as aluminum, magnesium, titanium or the like, and engineering plastic having high bending rigidity and strength, and fiber-reinforced plastics or the like may be used. Further, by providing a plurality of punched holes in the reinforcing plate, distributed in the longitudinal direction of the guide, a significant reduction in the overall weight of the guide can be attained.

The attachment means for attaching the guide to an inner wall of an engine may be a mounting pin, a mounting bolt and the like. For a movable guide, the attachment means serves as a pivot at one end of the guide. Attachment means may be provided at both ends of a fixed guide. In either case, the specific shapes of the attachment means are not particularly limited.

The mounting hole in the guide body, which is nearly circular, but slightly elongated in the front-to-back direction, overlaps the circular mounting hole in the reinforcing plate. The guide body is mounted on an inner wall of an engine by an attachment means, inserted through both mounting holes. Even if a shift in the relative positions of the guide body and the reinforcing plate occurs during the mounting of the guide, an attachment means such as a mounting bolt or the like can be easily inserted and secured. The relative positions of the holes in the guide body and reinforcement plate can be adjusted in the process of mounting the guide on the attachment means.

In the case of a movable guide, when the guide body, which is composed of synthetic resin, is pivoted on a bolt or other attachment means on an inner wall of an engine, it is subject to thermal shrinkage as a result of its exposure to high temperature. The elongated mounting hole in the guide body not only absorbs the positional shift due of the guide body resulting from thermal shrinkage, thereby ensuring smooth pivoting of the guide on the attachment means, but also absorbs deformation of overall shape of the guide, and maintains the strength of the guide over a long period of time.

Since a positioning guide wall is provided on one end of the plate-receiving portion of the guide body, the reinforcing plate is guided in the front and back direction during assembly. The positioning guide wall also contributes to the restriction of the reinforcing plate against longitudinal shifting while the guide is in use.

DETAILED DESCRIPTION OF THE PREFERRED EMBODIMENTS

Figure 1:
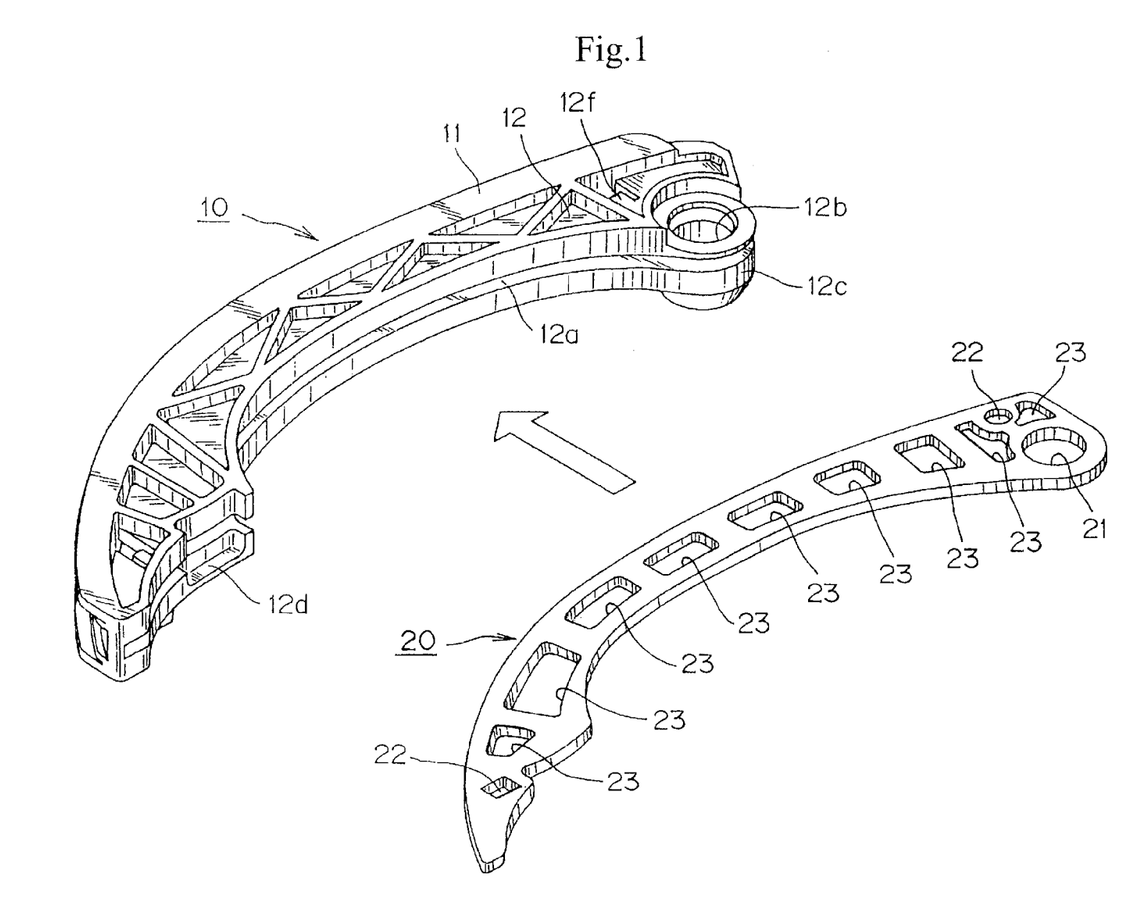
FIG. 1 is an exploded view of a movable guide in accordance with the invention.

The movable guide shown in FIG. 1 is a two-piece structure consisting a guide body 10 integrally molded of synthetic resin, and a reinforcing plate 20 punched from a steel sheet. The two-piece structure is obtained by inserting the reinforcing plate 20 into the guide body 10 in the direction of the arrow.

Figure 2:
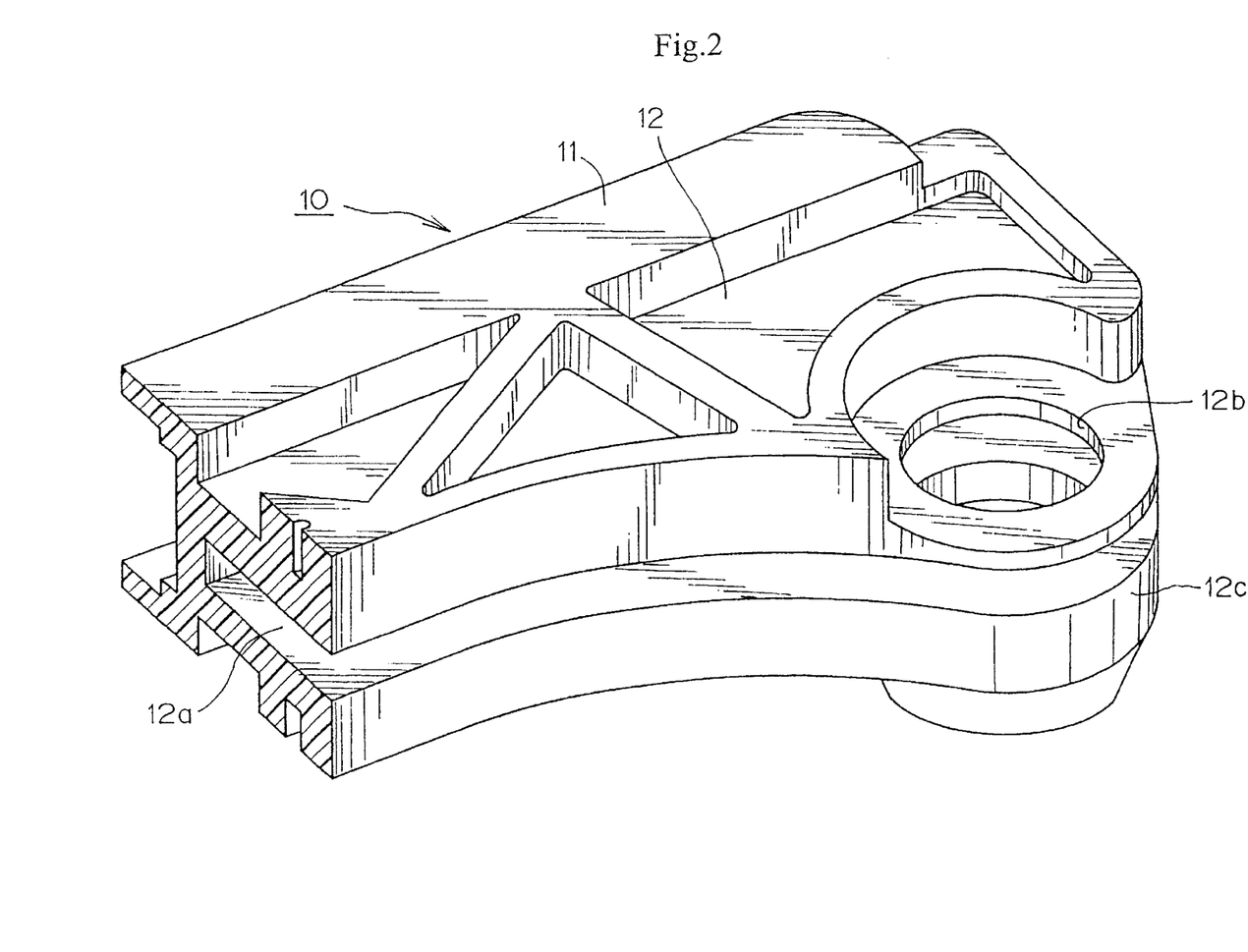
FIG. 2 is a fragmentary view showing details of the mounting portion of the movable guide of FIG. 1, without the reinforcing plate.

The guide body 10 comprises a shoe 11, having a surface on which a chain travels in sliding contact, and a plate-receiving portion 12 on the back side of the shoe 11. The plate-receiving portion extend longitudinally along the guide, as shown in FIGS. 1 and 2. The plate-receiving portion 12 includes a slot 12a extending along the longitudinal direction of the guide and open in a direction facing away from the back side of the shoe. The plate-receiving portion includes a boss 12c, having a mounting hole 12b for mounting on a bolt, pin or the like on an inner wall of an engine, as shown in FIG. 8. The plate-receiving portion also has a tensioner contact portion 12d, for engagement with the plunger of a tensioner T as shown in FIG. 8.

Figure 3:
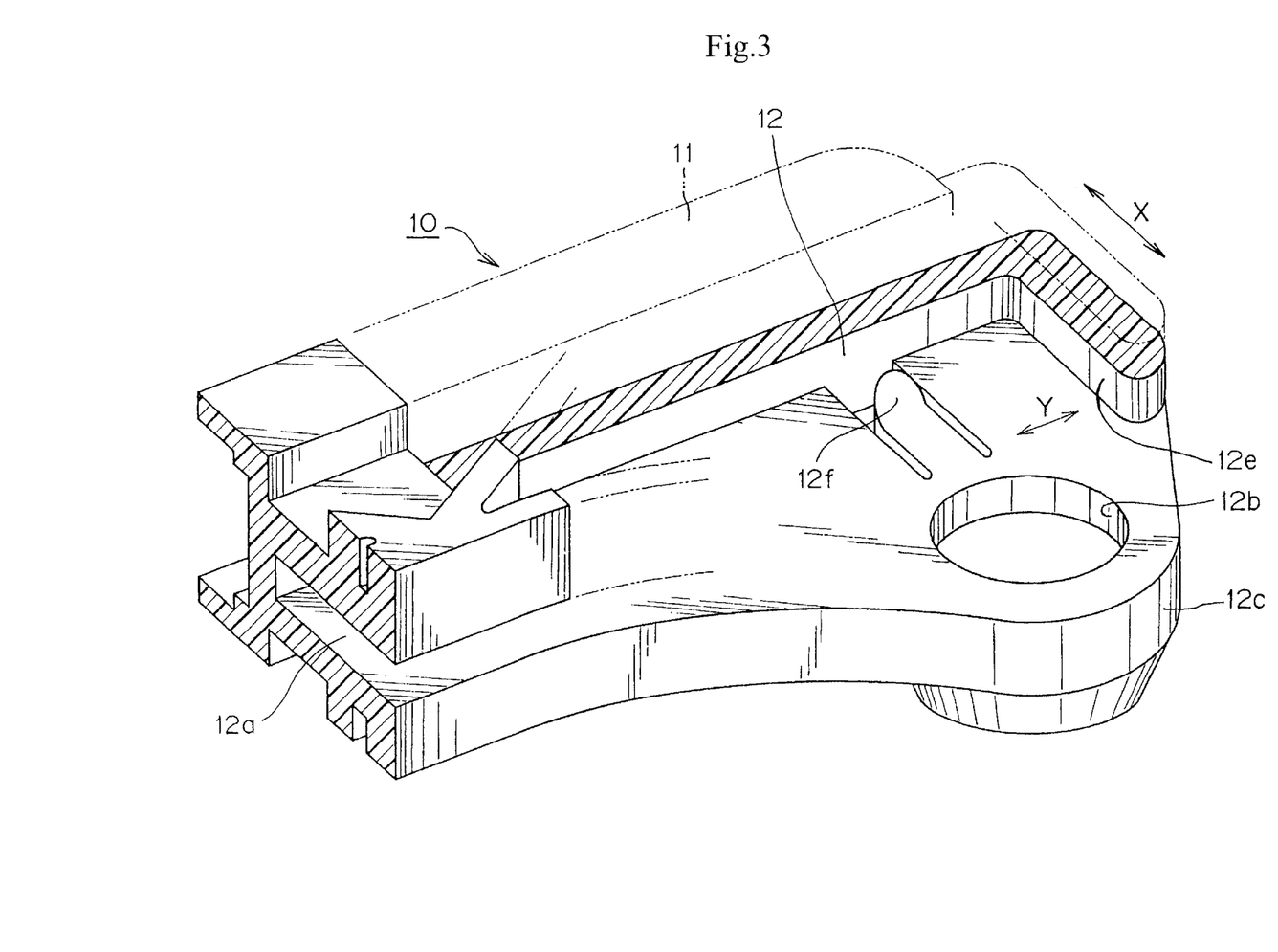
FIG. 3 is a cut-away view showing internal details of the mounting portion of the guide.

As shown in FIG. 3, a positioning guide wall 12e is provided at one end of an inside surface of the plate-receiving portion 12 of the guide body 10. The positioning guide wall 12e is adapted to guide the reinforcing plate 20 as it is moved in the front-to-back direction X during assembling of the guide. The positioning guide wall 12e also limits the positional shift of the reinforcing plate 20 in the longitudinal direction Y during operation of the guide.

A locking piece 12f, shown in FIG. 3, which is an integral part of the plate-receiving portion 12, protrudes into the slot 12a in the guide body 10 in order to lock the reinforcing plate 20 in the slot.

As shown in FIG. 1, the reinforcing plate 20 includes a bored circular mounting hole 21, at a position to be in register with the mounting hole 12b of the guide body 10 when the guide body and reinforcing plate are assembled. The mounting hole 21 fits a bolt, pin or other attachment means (not shown), which is inserted through the mounting hole 12b in the guide body 10 and the circular mounting hole 21 in the reinforcing plate 20.

A locking hole 22, shown in FIG. 1, engages the locking piece 12f (FIG. 3), which protrudes into the slot 12a in the guide body 10 in order to lock the reinforcing plate 20 in place. Punched holes 23 are distributed along the longitudinal direction of the reinforcing plate for weight reduction.

Figure 4:
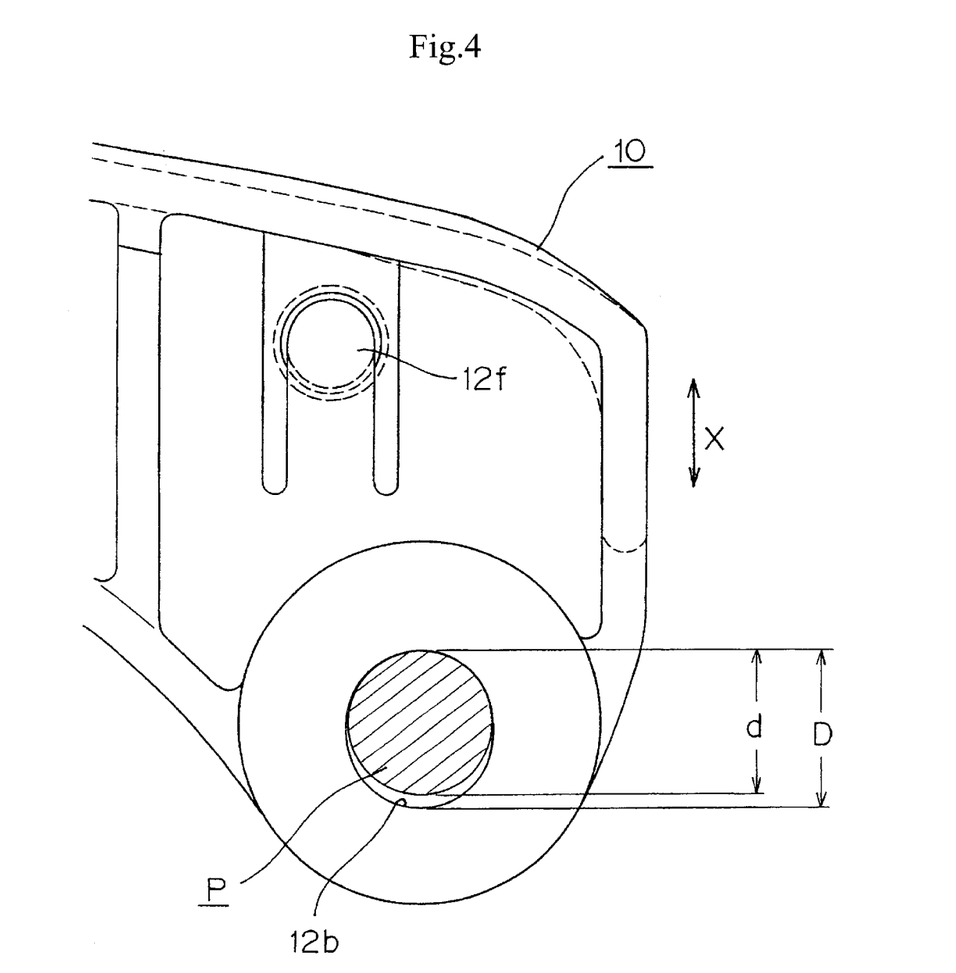
FIG. 4 is a schematic view showing the relationship between the long mounting long hole in the guide body and the circular mounting hole in the reinforcing plate.

A distinguishing feature of the invention is the relationship between the mounting hole 12b in the guide body 10 and the circular mounting hole 21 in the reinforcing plate 20. This relationship is depicted in FIG. 4. The mounting hole 12b in the plate-receiving portion 12 of the guide body 10 is nearly circular, but slightly elongated in the front-to-back direction X of the guide, so that its length D of hole 12b, in the front-to-back direction, is slightly greater than the diameter d of the circular mounting hole in the reinforcing plate 20. Because of the difference between the length D and the diameter d, the elongated mounting hole 12b overlaps the circular hole 21. The elongation of hole 12b provides a clearance, allowing the position of the hole 12b, and therefore the position of the guide body 10, to be adjusted in the front-to-back direction X during mounting of the guide. The locking piece 12f can be positioned so that it firmly locks the reinforcing plate in engagement with the bottom of the slot 12a, in which case the circular mounting hole 21 cannot move relative to elongated mounting hole 12b. However, the locking piece may be positioned so that the locking piece and the bottom of the slot 12a allow the reinforcing plate to move, toward and away from the bottom of the slot, through a range of movement in at least part of which the reinforcing plate is fully within an axial projection of the elongated mounting hole 12b. Preferably the locking piece is spaced from the bottom of the slot 12a by a distance which allows movement of the reinforcing plate through a limited range in which the circular mounting hole 21 in the reinforcing plate is always fully within an axial projection of the elongated mounting hole 12b.

Figure 5:
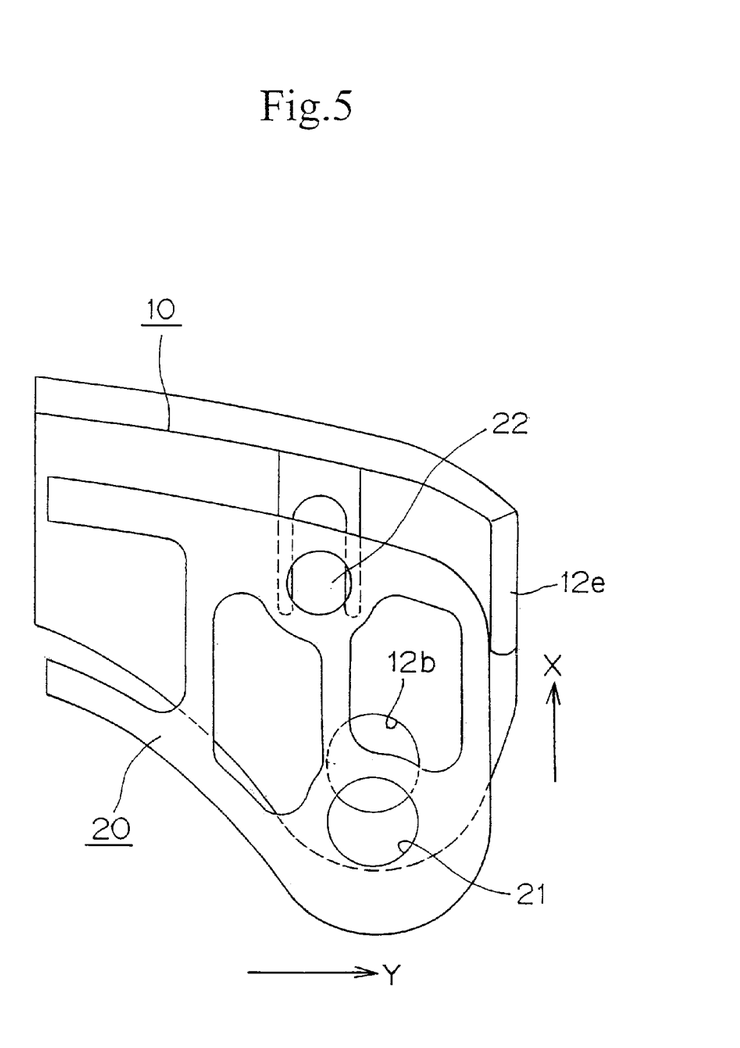
FIG. 5 is a schematic view illustrating the manner in which a reinforcing plate is fitted into the guide body.
Figure 6:
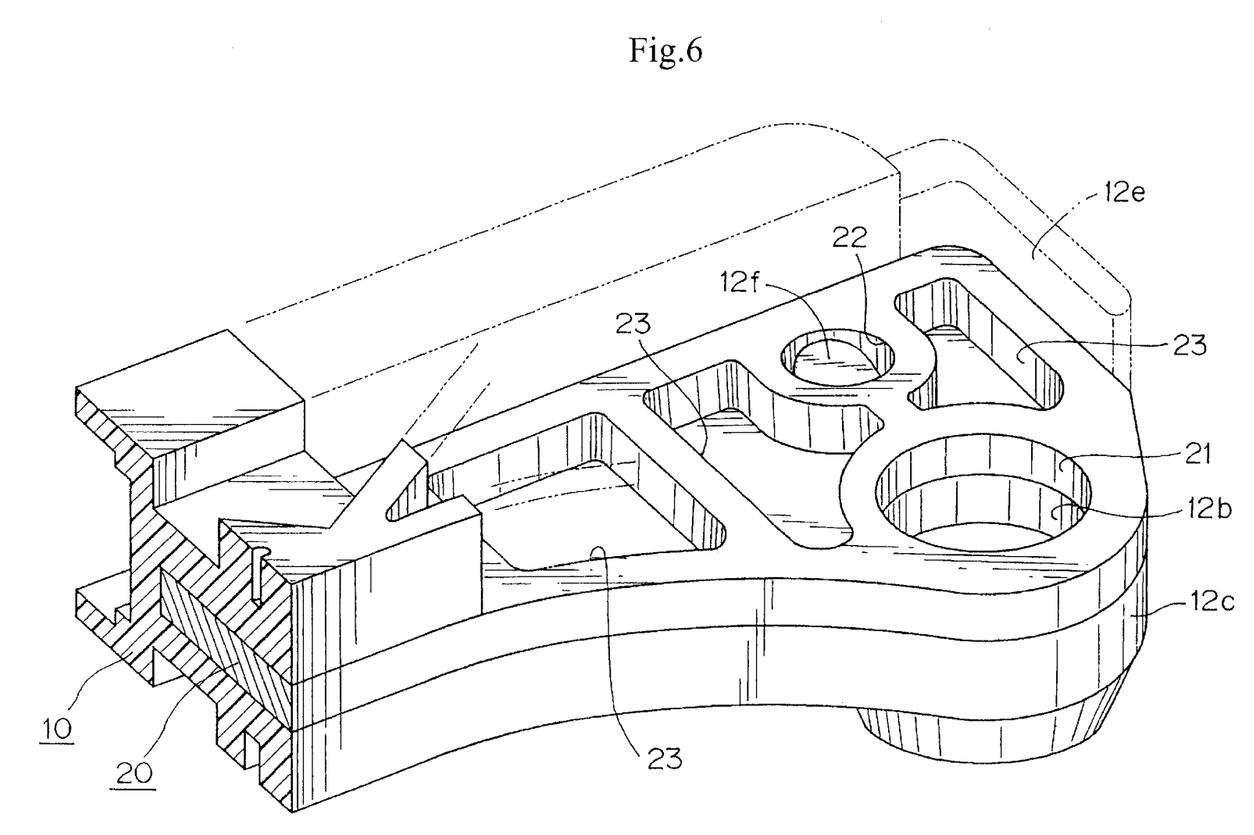
FIG. 6 is a cut-away view showing the reinforcing plate fitted into the guide body.
Figure 7:
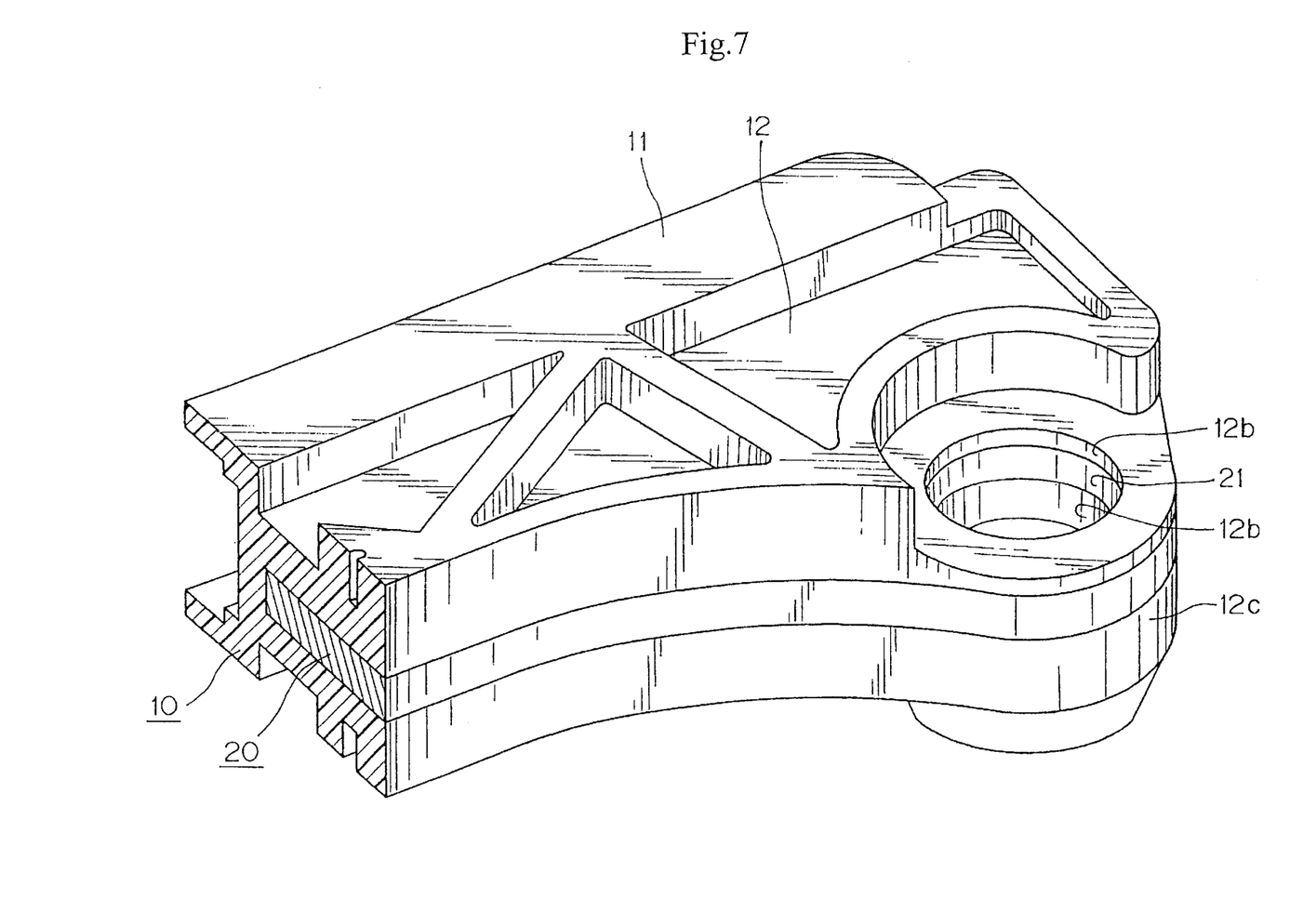
FIG. 7 is a fragmentary view showing details of the mounting portion of the movable guide of FIG. 1, with the reinforcing plate in place in the guide body.

The movable guide includes the slightly elongated mounting hole on the guide body 10 and also a positioning guide wall 12e (FIG. 3). Thus, when the movable guide is mounted on an inner wall of an engine by a mounting bolt P, which is inserted through the elongated mounting hole 12b in the guide body 10 and the circular mounting hole 21 in the reinforcing plate 20, the guide may be adjusted in the front-to-back direction. Moreover, as shown in FIG. 5, in the assembly of the guide, the circular mounting hole 21 in the reinforcing plate can be easily adjusted in the X and Y directions, and positioned in the proper relationship to the elongated mounting hole 12b in the guide body as depicted in FIGS. 5 and 6. Accordingly, the reinforcing plate 20 can be fitted easily into the guide body 10 during assembly of the guide, and the guide body 10 and the reinforcing plate 20 can be mounted on the inner wall of an engine or the like while being fastened together.

Because the shoe 11 and the plate-receiving portion of the guide body are integrally molded as a unit from a synthetic resin, the chain or other transmission medium slides on the guide body itself, and it is not necessary to provide a separate shoe. Thus, the number of separate parts of the guide is reduced.

The reinforcing plate 20, which fits into the slot 12a of the plate-receiving portion 12, improves the bending rigidity and strength of the guide, compared to that of a guide having a conventional reinforcing plate disposed in parallel with a contact sliding surface of the shoe. At the same time, the reinforcing plate achieves an overall reduction of the weight of the guide. Additionally, since the reinforcing plate fits into a slot in the guide body, the guide can have a simple shape. Moreover, the reinforcing plate 20 can be produced simply by press punching. Accordingly, the movable guide in accordance with the invention is advantageous in terms of accuracy, production cost, and ease of assembly, and automated assembly can be carried out.

The movable guide is mounted on an inner wall of an engine by an attachment means P inserted through the elongated mounting hole 12b in the guide body 10 and the circular mounting hole 21 in the reinforcing plate 20. When the movable guide is used in a high temperature environment, even if the guide body 10 and the reinforcing plate 20 have different coefficients of thermal expansion, shape deformation, which is liable to occur in the guide, is avoided because the ends of the guide body 10 and the reinforcing plate 20 remote from the mounting holes 12b and 21 are free to move relative to each other in the longitudinal direction of the guide. Therefore deformation and breakage of the guide due to thermal effects are avoided.

Although the invention has been described with specific reference to a movable guide used with a tensioner, many of the advantages achieved in a movable guide in accordance with the invention can be realized in a fixed guide having a similar mounting hole structure.

Even if a the relative positions of the guide body and the reinforcing plate shift during the mounting of the guide, an attachment means such as an mounting bolt or the like can be easily inserted and secured.

Moreover, since a positioning guide wall is provided at one end of the plate-receiving portion, the reinforcing plate is guided in the front-to-back direction during assembly, and positional shifting of the reinforcing plate in the longitudinal direction of the guide during operation is also restricted. Thus, the reinforcing plate can be fitted easily into the guide body during the assembly and the guide can be mounted simply and easily.

I claim:

1. A guide for a flexible traveling power transmission medium comprising an elongated guide body composed of an elongated shoe having a front surface for sliding contact with the power transmission medium and a back side, and a plate-receiving portion extending longitudinally along the back side of said shoe and having a longitudinally extending slot open in a direction opposite to the direction in which said front surface of the shoe faces, the shoe and plate-receiving portion being integrally molded as a unit from a synthetic resin, and a reinforcing plate fitting into said slot, wherein the guide body has a nearly circular, but elongated, mounting hole adjacent one end of the guide body, the elongated mounting hole being elongated in the front to back direction of the shoe, and the reinforcing plate has a circular mounting hole, the elongated mounting hole overlapping the circular mounting hole, and an attachment means, inserted through said circular and elongated mounting holes, and supporting the guide on an inner wall of an engine.

2. A guide according to claim 1, in which the plate-receiving portion has first and second ends spaced from each other along the longitudinal direction of the guide body, and in which the guide body has a positioning guide wall at one end of the plate-receiving portion, for guiding the reinforcing plate in the front-to-back direction of the shoe during assembly of the guide, and limiting the shift of the reinforcing plate in the longitudinal direction of the guide body during operation of the guide.

* * * * *